CAPACITOR DISCHARGE CIRCUIT WITH POSITIVE CONTROL MEANS

Filed July 3, 1968

INVENTOR
RICHARD G. KALLAGE, JR.
BY Dressler, Goldsmith, Greenawalt & Dewey
ATT'YS.

United States Patent Office 3,474,291
Patented Oct. 21, 1969

3,474,291

CAPACITOR DISCHARGE CIRCUIT WITH POSITIVE CONTROL MEANS

Richard G. Kallage, Jr., Wilmette, Ill., assignor to Underwriters Safety Device Company, Chicago, Ill., a corporation of Illinois Filed July 3, 1968, Ser. No. 742,357
Int. Cl. H05b 37/02, 39/04, 41/14
U.S. Cl. 315—241 13 Claims

ABSTRACT OF THE DISCLOSURE

The combination of a capacitor discharge ignition system with a control circuit therefor. In the capacitor discharge circuit, a principal capacitor is charged by rectified current, and discharged through an inductor under the control of a semiconductor controlled rectifier or the like, when a pulse applied to the gate of the SCR renders the SCR conductive. The inductor is coupled to ignition electrodes across which an ignition spark is generated. The current is fed to the gate of the SCR through voltage-sensitive switch means which are rendered conductive only at or above a certain voltage level. In the novel control circuit, diode clamping means is provided to make certain that the voltage necessary to render the switch conductive is never attained until the starting circuit is activated, and thereafter, the capacitor discharge system will fire a predetermined number of times and return to a stable state, to await re-activation for repeating the cycle. The system prevents accidental firing of the ignition circuit by reason of random current pulses which might be picked up by the system and trigger the voltage-sensitive switch means. In a modification, the timing circuit which determines the length of time during which the discharge or firing circuit will oscillate is arranged so that the number of firing pulses generated by the discharge circuit is proportional to an input voltage to the timing circuit, which appears across a plurality of dropping resistors. In such environment, the input voltage will be digitally "read out" since the number of pulses generated by the discharge circuit is proportional to the voltage on the timing capacitor.

BACKGROUND OF THE INVENTION

Field of the invention

The primary field of the invention is generally that of electrical components for gas-fired appliances, and, more particularly, that of improvements in capacitor-discharge type spark ignition systems, such as those used in gas-fired appliances or the like. The improvements in this invention reside principally in the combination of an ignition system of the capacitor discharge type with a control circuit means associated therewith which simultaneously provides safety against accidental firing, and also affords precise, predetermined control over the length of time during which the capacitor discharge system will fire before reaching a quiescent state. Because this relation depends on certain features of the circuit, the circuit is also useful in other environments, such as in delivering a number of discrete pulses or digital signals of a standard amplitude, wherein the number thereof is proportional to the voltage applied to the control circuit. In this way the amplitude of an incoming signal may be directly determined by observing the number of pulses of a fixed amplitude which will be given out by the capacitor discharge circuit so that, for example, digital measurements of an analog quantity may be made.

In one particular aspect of the invention, the principal capacitor is discharged under the control of an SCR through an inductor by which it is coupled to the firing electrodes. The gate of the SCR is connected through a neon tube or silicon bilateral switch to a line which connects the charging line of the principal capacitor to a ground potential line through an RC circuit containing a clamping diode. In this manner, once the principal capacitor is charged the diode will always remain conductive so that a sufficient voltage cannot be built up on a reference voltage or triggering capacitor to fire the switch which "opens" the gate of the SCR.

Description of the prior art

In general, capacitor discharge systems are known in the prior art, and are known to be useful in a number of environments. By "capacitor discharge systems" as used herein is meant such systems which are designed to discharge intermittently, that it, although their discharge or firing rate may or may not be with a constant frequency, their principal use contemplates remaining in a quiescent state triggered, then firing for a time, and returning automatically to the quiescent state. Thus, whereas the capacitor discharge system of the present invention is capable of continuous firing operations, it is not normally used in this manner.

Referring now particularly to the present invention, the system used therein is designed to provide an improved system for overcoming disadvantages of known prior art systems used as ignition circuits for electrically ignited gas burning appliances, such as electrically ignited gas ranges and ovens. In such appliances, it is desired, and in some cases required by law or industry codes, that such firing devices start instantly, that they are capable of incorporation into unitary control means for safety purposes, and that, once firing is initiated, it continues for a given time before stopping. In addition, it is desired that such units are not fired or randomly discharged from time to time either by stray currents or by their own inherent electronic properties. As used herein, the word "random" may be taken as synonymous with "extremely low frequency," in relation to the ordinary firing frequency of the circuit.

Prior art capacitor systems have been characterized by the lack of positive shutoff means, that is, many prior art firing systems had poor shutoff performance, since the combination of capacitor and switch leakage would often allow enough current to leak past the switch and around the capacitor to fire a current-sensitive trigger element.

In prior art system utilizing the voltage sensitive trigger element concept, leakage around the switch would often result in current which, although partially passing to the ground through a voltage divider network, would nevertheless be sufficient to cause the voltage on the firing capacitor to rise above that necessary to trigger the circuit.

In the case of both prior art design types, the amount of leakage and other imperfections in the components of the units were generally inversely proportional to the cost. Hence, it has been desired to obtain an ignition circuit of dependable performance at reasonable cost.

Likewise, a number of prior art designs utilized a control concept in which firing rate was not constant until shutoff, but was initially fast, and became slower with each cycle. Shutoff performance in such circuits is not desirable, especially since most current standards call for firing over at least a given time period following which immediate shutoff is desired. Time control in such circuits has been difficult to obtain in practice.

SUMMARY OF THE INVENTION

In view of the shortcomings of the prior art devices of this character, there has been a need for a reliable and economical ignition system for gas fired appliances.

Therefore, an object of the present invention is to provide an ignition system having positive shutoff, definite time control, relatively silent operation, and low cost.

A further object of the invention is to provide a system in which only momentary contact of a switch is necessary to initiate firing, following which the circuit will fire or oscillate for a given time, and then return to a quiescent state.

Another object of the invention is to provide an ignition system in which control of the discharge of a firing capacitor is effected by a circuit which includes diode clamping means therein for maintaining a capacitor in the trigger circuit below a desired potential.

A still further object is to provide a combination capacitor discharge ignition system and a control circuit therefor in which the control circuit includes a timing capacitor for receiving a pulse of current which renders a diode nonconductive while the pulse is discharging from such timing capacitor through a resistor through which the output of the diode would also normally discharge.

A still further object of the invention is to provide a combination capacitor discharge system and control or timing circuit therefor in which the control circuit is so arranged as to cause the length of time during which the discharge circuit fires at a fixed frequency to be proportional to the voltage of a signal applied to the control circuit.

These objects of the invention, and other objects thereof which are inherent therein, will become more apparent when considered in conjunction with a description of the preferred embodiments of the invention, which are shown in the drawings, and in which like reference numerals indicate corresponding parts throughout.

DESCRIPTION OF THE PREFERRED EMBODIMENTS

Before referring in detail to the preferred embodiments in the invention, it will be understood that the expression "semi-conductor controlled rectifier," "silicon controlled rectifier," and "SCR," will be used interchangeably herein, since almost all semiconductor controlled rectifiers, as a practical matter are silicon controlled rectifiers, and "SCR" is an accepted abbreviation for both.

In addition, the rectifier components used herein are shown as being solid state units, but it will be understood that their counterparts in vacuum or gas tubes may be used if desired.

The electrodes are only schematically shown, since it will be understood that their location and composition is a matter of choice, and these elements do not form a necessary part of the invention.

Figure 1:
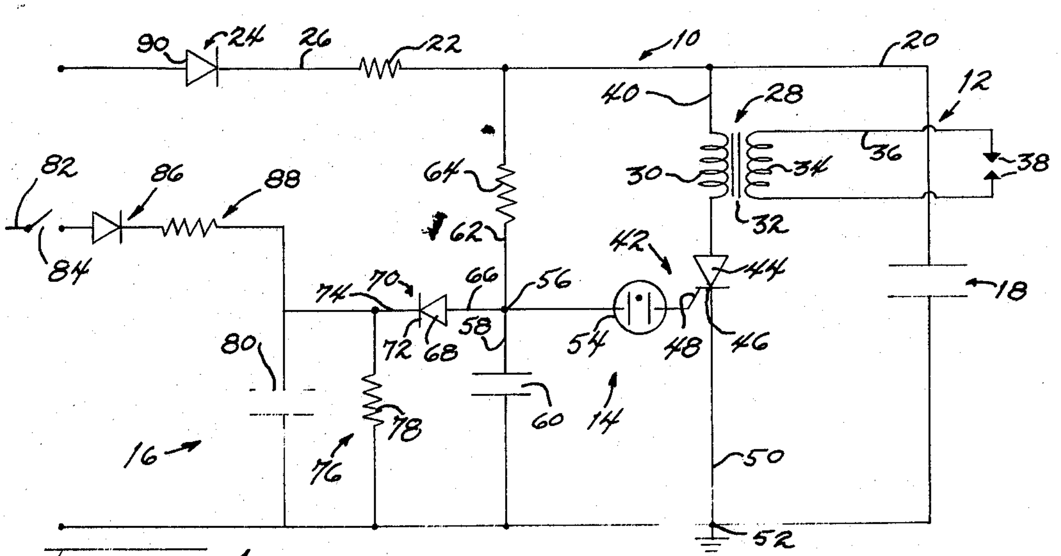
FIG. 1 is a schematic diagram of a combination capacitor discharge and control system of the present invention, which may be used for creating ignition sparks for a gas appliance.

Referring now to the embodiment shown in FIG. 1, a combination capacitor discharge and control system 10 is shown. This unit comprises three principal elements, a firing circuit 12, trigger circuit 14, and a timing circuit 16. The firing circuit includes a principal capacitor 18, a charging line 20 for the capacitor 18, connected to a current limiting charging resistor 22, one end of which is attached to a rectifying means 24 in the form of a solid state diode, which provides pulsating half-wave direct current output. Conventional filtering means such as an inductance-capacitance circuit (not shown) may be placed in the line 26, between the diode 24 and the resistor 22, if it is desired to damp the waves from the current passing through the diode, but this device is not necessary, and accordingly, since it is entirely conventional, further description thereof is omitted.

The second principal component of the firing circuit 12 is a transformer 28 which includes a primary inductance winding 30, a core 32 and a secondary winding 34, the output terminals 36 of which are connected to one or more pairs of electrodes 38. A line 40 connects the charging line 20 to the primary winding 30 of the transformer 28. The transformer 28 is preferably a "multi-gap" step up pulse transformer having about 200 secondary windings per primary winding. By "multi-gap," as used herein, is meant a transformer which can deliver a spark through a plurality of pairs of electrodes in series; for example, four to six electrode pairs.

An additional principal element of the firing circuit is a switch means 42 in the form of a semi-conductor controlled rectifier having an anode 44, a cathode 46 and a gate 48. A discharge line 50 connects the SCR 42 between the primary winding 30 and a ground potential reference point 52.

Referring now to the trigger circuit 14, this circuit includes voltage sensitive trigger means 54 in the form of a neon filled tube, one terminal of which is connected to the gate 48 of the SCR 42 and the other of which is joined at a node 56 to a lead 58 which is attached to a triggering capacitor 60, to another lead 62 which is connected to a triggering capacitor charging resistor 64, and to diode lead 66 connected to the anode 68 of a clamping diode 70. The triggering capacitor charging resistor 64 is connected to the principal capacitor charging line 20, and therefore, one side of the capacitor 60, the trigger means 54, and the diode 70 0are at the same potential. The other side of the capacitor 60 is at ground potential, the resistor 78 is disposed between ground and the diode 70, and the capacitor 80 is in parallel with the resistor 78, between the diode 70 and ground potential.

A third principal component of the capacitor discharge and control system is the control or timing circuit 16. In this circuit, the diode 70, which has the anode 68 thereof connected through the junction 56 and the resistor 64 to the charging line 20, has the cathode 72 thereof connected through a line 74 to a timing network 76, which comprises a resistor 78 and a timing capacitor 80. The opposite terminals of the resistor 78 and capacitor 80 are at ground potential. This resistance-capacitance timing circuit 76 may also receive current flow from an outside alternating current (AC) line 82 when a switch 84 is closed, since a diode 86 is provided to rectify current coming from the line 82 and supply such current to the timing circuit 76 through the current limiting resistor 88, which is disposed between the diode 86 and the timing circuit 76. The lead 74 also provides a connection between the line 82 and the diode 70.

In the use of this device, in its principal environment, the switch 84 is operatively associated with a switch which turns on the gas burner or like unit, for reasons which will be described in greater detail herein.

Referring now to a typical embodiment of the invention, the performance of the unit is satisfactory when used as an oven or range ignition module with the various components having the values set forth below. The principle capacitor 18 is a 20 microfarad, 250 voltage DC capacitor, the resistor 22 is a 1,000 ohm resistor, and all diodes 24, 70, and 86 are one ampere 400 PIV ("peak inverse voltage") diodes. The transformer 28 is a high voltage pulse transformer having a step up ratio of 200 to 1. The SCR is preferably a Motorola 2N4443 or equivalent and the neon bulb may be a 5AH bulb, for example. The trigger capacitor charging resistor 64 is a 22 megohm, ½ watt resistor, and the trigger capacitor 60 is a 0.047 microfarad, 200 volt DC capacitor. The current limiting resistor 88 is a 220 ohm ½ watt resistor. In the timing circuit 76, the resistor 78 is 2.2 megohm, ½ watt resistor, and the capacitor 80 is a 10 microfarad 250 volt DC capacitor. Obviously, these values are typical, illustrative values for a circuit of representative performance. The exact characteristics of the circuits may be changed by varying the values of these components.

The use and operation of the combination capacitor discharge and control system will now be discussed. The anode 90 of the diode 24 is connected by any suitable means to a 110 volt, alternating current source, and a pulsating direct current is supplied through the line 26 to the resistor 22, and through the charging line 20. Initially, assuming that the principal capacitor 18 is initially uncharged, it rapidly obtains a full charge since an uncharged capacitor has little or no initial DC resistance. Since the resistor 64 is a 22 megohm resistor, only a relatively insignificant amount of current will pass therethrough, and the capacitor 18 will quickly obtain a full charge. The gate 48 of the SCR 42 is so biased in this condition that no current will flow through the SCR 42, and accordingly, current will not flow in the primary 30 of the transformer 28. When the capacitor 18 becomes fully charged, a minor amount of current trickles through the resistor 64, charging the capacitor 60 to a state such that the path to ground through the diode 70 and the resistor 78 offers less resistance than does further charging of the capacitor. This condition also may exist with respect to the capacitor 80. The diode 70, in the quiescent state, is normally biased to allow current flow therethrough, and accordingly, an important feature of the invention is that if a random surge or pulse of current should flow through the resistor 64, it will pass through the diode 70 rather than raising the charge on the capacitor 60 to an undersirably high level. Thus, when the capacitor 18 is fully charged, and the SCR is in a non-conductive state, an almost insignificant amount of current trickles through the diode 70, and through the timing circuit resistor 78. The unit will maintain this state indefinitely and is not subject accidental to firing.

When it is desired to fire a spark across the electrodes to obtain ignition, a burner switch or the like (not shown) is turned, it being understood that such burner switch is associated with the electrical switch 84. Upon momentary closing of the switch 84, a pulse of current flows through the diode 86, which rectifies the current from the AC source 82, and the current thereupon charges the capacitor 80 in a time relation which is a well known inherent function of the RC circuit 76, that is, a charge builds up, at first rapidly, and then more slowly as the capacitor becomes fully charged. When the capacitor 70 is charged, current therefrom tends to pass through the resistor 78 to the ground potential. However, in view of the resistance of the resistor 78, flow out of the capacitor 80 also acts to bias the diode 70 to a non-conductive state. Assuming that the switch 84 has been closed momentarily, the capacitor 80 will discharge through the resistor 78 in a given time which is proportional to the resistance of the resistor, the capacitance of the capacitor 80, and the voltage of the charge on the capacitor, since the current may not flow backwardly through the diode 86 or into the remainder of the circuit through the diode 70. After the charge on the capacitor 80 has been dissipated, this part of the circuit returns to its quiescent or equilibrium state, that is, with the capacitor 80 having only a slight charge.

However, when the diode 70 is biased to a non-conductive state, current flowing through the resistor 64, although small, must thereupon further charge the trigger capacitor 60, and soon the capacitor 60 reaches a voltage at which the current stored thereon will be discharged through the neon tube or voltage sensitive trigger means 54. Thus, in this embodiment, it will be understood that the firing voltage of the trigger 54 is less than the voltage supplied through the resistor 64, but more than the charge which normally is stored on the capacitor 60. At no time, however is there sufficient potential at the junction 56 to cause the diode to conduct when the capacitor 80 has a substantial charge thereon. When the firing potential of the trigger 54 is reached and a current flows in the trigger 54, this pulse is supplied to the gate 48 of the SCR 42, rendering the SCR conductive, and allowing the capacitor 18 to discharge therethrough. In pulsing through the SCR 42, the current passes through the primary 30, where induction creates a high voltage current in the secondary 34. The pulse of current produced in the secondary 34 passes through the leads 36, firing a spark across the electrodes 38. After the capacitor 18 has been substantially discharged, the transient negative voltage swing due to the oscillation of the inductance-capacitance firing circuit serves to render the SCR non-conductive again. Thereupon, the current passing through the diode 24 rapidly charges the capacitor 18, and when further charge thereof offers excessive resistance, current flow through the resistor 64 becomes significant, and again builds up the voltage on the capacitor 60 to a level sufficient to fire the trigger 54, and the pulse passing therethrough again triggers the SCR to a conductive state, causing discharge of the capacitor and appearance of a spark across the electrodes 38, as described above.

This oscillating cycle then continues until current flowing through the resistor 64 may pass through the diode 70, preventing the trigger capacitor 60 from reaching the firing voltage of the trigger means 54. This time is in turn determined by the discharge time of the capacitor 80, as pointed out above.

Thus, in a preferred embodiment, using the values for components set forth above, and assuming that the contact of switch 84 is momentary but long enough to fully charge the capacitor 80, that is, only about 30 milliseconds, the discharge time through the resistor will be about 8 seconds, and the oscillation frequency in the firing circuit may be about 2 to 5 cycles per second. Since units like this are normally associated with appliances, and since it is desired or required by safety codes or industry standards that when a burner is turned on, the ignition module associated therewith will supply an ignition spark for at least a certain time, commonly 8 seconds, the values set forth are preferred.

Another desirable feature is that the ignition circuit will shut off completely and reliably but will maintain a satisfactory firing rate during the time it is in a state of oscillation. In prior known systems whose firing rate was determined by current decay or capacitor discharge not associated with a diode clamping circuit, the firing rate would be initially rapid and slow thereafter, since many such circuits are characterized by an exponentially decreasing firing rate, which results in poor shutoff performance, poor firing rate, or both.

However, the use of the RC circuit as a time circuit and the use of the diode clamping means as set forth in the above example provides for safety against accidental discharge caused by transient current pulses or the like, and facilitates both timing and rate control as set forth above.

Figure 2:
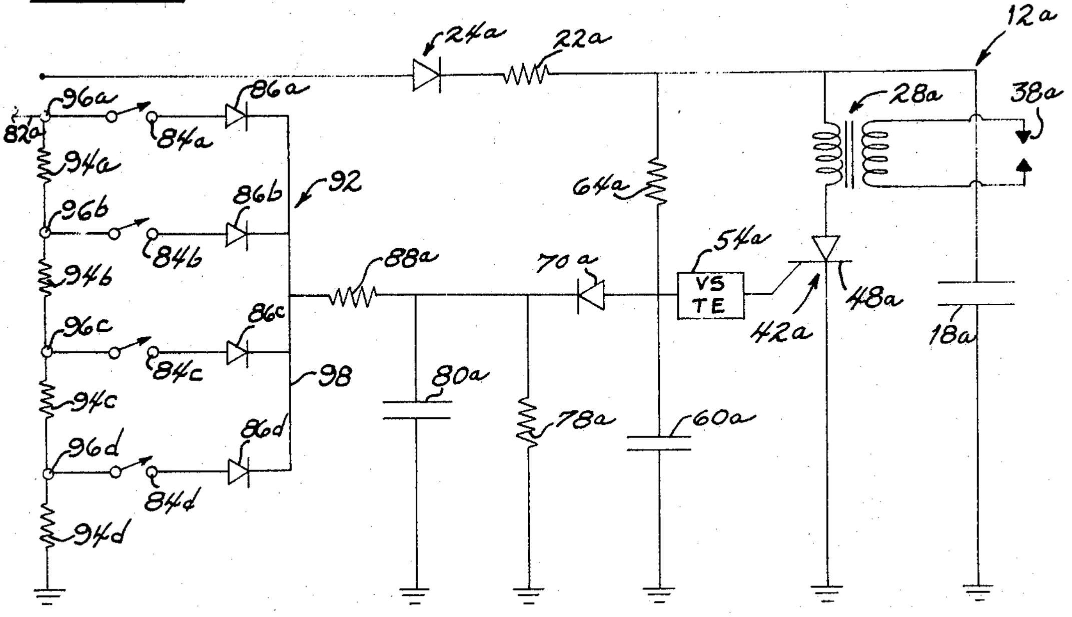
FIG. 2 is a schematic diagram of a modified form of the combination system of FIG. 1, the embodiment of FIG. 2 including means therein for selecting a different input voltage to be applied to a portion of the device.

Referring now to the embodiment of the invention shown in FIG. 2, a basically similar circuit is shown which may be used for the same purpose described above, but also may be used for another purpose. In this case, the diode **24*a* and the resistors 22*a*, 64*a*, 78*a* and 88*a* are similar to their counterparts in disposition and function, as are the capacitors 18*a*, 60*a* and 80*a*. Likewise, a clamping diode 70*a* is provided, as is a semiconductor controlled rectifier 42*a*. Transformer means 24*a* is also provided in the same relation, except that, in this case, the electrodes 38*a*** may have visual or graphic visual display means (not shown) associated therewith, that is, a bulb, meter, scalar or counter or the like may be present, to indicate the number of pulses of current which are fed to the electrodes.

In this embodiment, the numeral **54*a*** is shown to designate a "box," to illustrate that this element may be, for example, a silicon bilateral switch, or other trigger means which are voltage sensitive, and will pass current therethrough to the gate 48*a* of the SCR 42*a* under proper conditions.

A principal difference between the circuit of FIG. 2 and the circuit of FIG. 1 resides in the provision of the means 92 for providing an input voltage of varying levels. This means comprises a network having a lead 82*a* which is attached to a suitable alternating current source such, as a 110 volt AC line. Connected to the lead 82*a* are a plurality of dropping resistors 94*a*, 94*b*, 94*c* and 94*d*. Associated with each junction 96*a*, 96*b*, 96*c*, 96*d* which joins the resistors 94*a*, 94*b* etc. to a point of lower potential are a plurality of switches 84*a*, 84*b*, 84*c* and 84*d*. Diodes 86*a*, 86*b*, 86*c*, and 86*d* are also provided in series with each switch, and, connected to the anodes of the diodes 86*a*, 86*b*, etc., is a connecting line 98. Current flowing through any one of the diodes 86*a*, 86*b*, etc. will flow into this connecting line 98, and thence through the resistor 88*a*, and will thus serve to charge the capacitor 80*a* with a voltage equal to or proportional to that impressed on each diode. Thus, a charge of a given voltage will be impressed on the capacitor 80*a* when switch 84*b* is momentarily closed, whereas a charge of higher voltage will be placed thereon by closing switch 84*a*, and a lower charge will appear on the capacitor when switches 84*c* or 84*d* are actuated. It is assumed, for purposes of this illustration, that the voltage charged to capacitor 80*a* will, in any case, be more than sufficient to render the diode 70*a* non-conductive.

In use, in this embodiment of the invention, a voltage of a given value may be tapped from the line 82*a* and used to charge the capacitor 80*a* to a voltage proportional to said given voltage. The length of time during which the firing circuit 12*a* will oscillate will then be determined by the value of this given voltage, and by which switch 84*a*, 84*b*, etc., is closed, since the time taken for the capacitor 80*a* to discharge through the resistor 78*a* is proportional to the voltage on such capacitor 80*a*.

In another embodiment of the invention, a lead such as that shown at 82 in FIG. 1 can be connected to a source which receives a current pulse of unknown voltage. Provided correct values are given to the other components of the circuit, the relative value or analog of such voltage can be determined by the number of pulses which the firing circuit generates in response to such signal. Thus, once the unit is standardized, it can be used to detect the voltage level of an incoming signal, and to indicate the level thereof directly by the number of pulses of fixed amplitude it will generate in the firing circuit.

In the last two embodiments described, the combination capacitor discharge, trigger, and control circuit, or controlled relaxation oscillator circuit can be used as a display device or as a teaching aid device, to illustrate the manner in which an analog or proportional quantity can be converted into a numerical or digital quantity.

In the embodiments described herein, a capacitor 60, 60*a*, is shown as a means of creating a voltage built up to fire a trigger element. A satisfactory unit can also be made by placing a resistor, such as a high resistance leak resistor, parallel to the capacitors 60, 60*a*. In the event the components are properly sized, the input to the timing capacitor 80 can be obtained by shunting current through a switch (not shown) from the charging line 20, instead of from an outside line 82.

In any case, however, the principal of diode clamping means being provided for maintaining a desired voltage level below that desired to operate a trigger element in a capacitor discharge system is still present, as are means for rendering the diode non-conductive, so that the trigger element can be actuated to initiate oscillation of the capacitor discharge circuit.

It will thus be seen that the present invention provides a novel capacitor discharge system and control circuit therefor, which has use as an ignition module, as a display or teaching aid, and has other uses and advantages, including those which are inherent in the invention, and others hereinbefore pointed out.

I claim:

1. A combination capacitor discharge and control system, comprising, in combination, a firing circuit including a principal capacitor, transformer means, electrode means across which a spark is to be generated, and switch means through which said principal capacitor may be discharged, a trigger circuit, including voltage sensitive trigger means operatively associated with said switch means in said firing circuit, and a reference and shutoff circuit for said capacitor discharge system, said reference and shutoff circuit including a timing circuit having a resistor and a capacitor in parallel and forming a resistance-capacitance network connected to one terminal of said trigger means, and diode means operatively associated with said reference and shutoff circuit, said diode means being connected between said resistance-capacitance network and said trigger means, means for charging said principal capacitor, and means for biasing said diode to a non-conductive state, to prevent current flow through said resistance-capacitance circuit.

2. A combination capacitor discharge and control system as defined in claim 1 which includes a triggering capacitor disposed parallel to said diode means for accumulating a charge of a given voltage thereon when said diode is rendered non-conductive, said capacitor having a fully charged voltage in excess of the voltage required to render said trigger means conductive, and insufficient to overcome the bias on said diode when said diode is rendered non-conductive.

3. A combination capacitor discharge and control system as defined in claim 1 which further includes a triggering capacitor charging resistor disposed parallel to said firing circuit and connected between said triggering capacitor and said means for charging said principal capacitor.

4. A combination capacitor discharge and control system as defined in claim 1 which further includes means for supplying a direct current to said capacitor in said resistance-capacitance network, whereby, when said capacitor is charged, said diode is rendered non-conductive.

5. A combination capacitor discharge and control system as defined in claim 1, in which said switch means through which said principal capacitor may be discharged comprises a semiconductor controlled rectifier.

6. A combination capacitor discharge and control system as defined in claim 1 in which said voltage sensitive trigger means comprises a neon tube.

7. A combination capacitor discharge and control system as defined in claim 1 in which said voltage sensitive trigger means comprises a semiconductor bilateral switch, said bilateral switch having one lead thereof connected to the gate of said semiconductor controlled rectifier.

8. A combination capacitor discharge and control system as defined in claim 1, in which a resistor is provided connecting said means for charging said principal capacitor to said trigger means, said resistor having extremely high resistance relative to the resistance of the portion of the capacitor discharge and control system disposed between said means for charging said principal capacitor and said principal capacitor, whereby said principal capacitor will charge rapidly following discharge thereof, and whereby, when said principal capacitor is charged, said resistor will pass relatively little current through said resistor in resistance-capacitance network.

9. A combination capacitor discharge and control system as defined in claim 8 in which said resistor disposed between said charging means and said trigger means has approximately 10 times the resistance of said resistor in said resistance-capacitance network.

10. A combination capacitor discharge and control system as defined in claim 1 in which means are provided for supplying a charge of varying voltage level to said capacitor in said resistance-capacitance network, whereby, when a given voltage is supplied to said capacitor, the voltage level thereon will determine the discharge time of said capacitor through said resistor in said resistance-capacitance network, and will in turn thereby determine the time during which said diode means is biased to said non-conductive state, and the number of pulses which appear across said electrode means as said principal capacitor discharges through said switch means, before said capacitor discharge system ceases spontaneous oscillation.

11. A combination capacitor discharge and control system as defined in claim 10, in which said means for providing a voltage of varying levels comprises a plurality of switches, each having a voltage dropping resistor associated therewith, whereby actuating a given switch causes charging of said capacitor in said resistance-capacitance network to a level proportional to the voltage level at said switch.

12. A capacitor discharge and control system comprising in combination, a firing circuit including a principal capacitor, and inductor through which said principal capacitor may be discharged, and switch means for controlling the discharge of said capacitor, voltage sensitive trigger means for actuating said switch means, charging means for said principal capacitor, said charging means also being connected to said trigger means, means for raising the voltage of a current passing through said means connected to said trigger means, and a timing circuit connected parallel to said means for raising said voltage, said timing circuit including a diode means therein connected to said trigger means, a resistance-capacitance network disposed in parallel and connected to said diode means, and means for impressing a given voltage on the capacitative element of said resistance-capacitance network, whereby said voltage on said capacitative element will determine the time during which said diode means remain non-conductively biased by said voltage, and in turn, the time during which the oscillator formed by said principal capacitor, said inductor, said switch, said trigger, and said voltage increasing means will oscillate before reaching a quiescent state.

13. A capacitor discharge and control system as defined in claim 12 in which said means for raising the voltage on said trigger means comprises a capacitor disposed in parallel with said trigger means and said resistance-capacitance network.

References Cited

UNITED STATES PATENTS

| | | | |
|---|---|---|---|
| 3,049,642 | 8/1962 | Quinn | 315—241 X |
| 3,051,870 | 8/1962 | Kirk | 315—183 X |
| 3,383,556 | 5/1968 | Tarter | 315—209 |

VOLODYMYR Y. MAYEWSKY, Primary Examiner

U.S. Cl. X.R.

315—245